United States Patent
Kansal et al.

(10) Patent No.: US 9,710,488 B2
(45) Date of Patent: *Jul. 18, 2017

(54) LOCATION ESTIMATION USING IMAGE ANALYSIS

(71) Applicant: Microsoft Technology Licensing, LLC, Redmond, WA (US)

(72) Inventors: Aman Kansal, Issaquah, WA (US); Feng Zhao, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,948

(22) Filed: Nov. 25, 2015

(65) Prior Publication Data

US 2016/0154821 A1 Jun. 2, 2016

Related U.S. Application Data

(63) Continuation of application No. 13/401,582, filed on Feb. 21, 2012, now Pat. No. 9,222,783, which is a
(Continued)

(51) Int. Cl.
*G06F 17/30* (2006.01)
*G01C 21/20* (2006.01)
(Continued)

(52) U.S. Cl.
CPC ....... *G06F 17/30241* (2013.01); *G01C 21/20* (2013.01); *G01C 21/206* (2013.01);
(Continued)

(58) Field of Classification Search
USPC .................................................. 382/100, 305
See application file for complete search history.

(56) References Cited

U.S. PATENT DOCUMENTS 6,163,699 A 12/2000 Naor et al.
6,275,707 B1 8/2001 Reed et al.
(Continued)

FOREIGN PATENT DOCUMENTS

WO WO2006001129 A1 1/2006
WO WO2006041734 A2 4/2006

OTHER PUBLICATIONS

Dudek et al., "Robust Place Recognition using Local Appearance based Methods," available as early as Dec. 12, 2006, at <<http://www.cim.mcgill.ca/~dudek/417/notes/icraFinal.pdf>>, IEEE Intl Conf on Robotics and Automation, Apr. 2000, 6 pages.
(Continued)

*Primary Examiner* — Ishrat I Sherali
(74) *Attorney, Agent, or Firm* — Lee & Hayes, PLLC

(57) ABSTRACT

An implementation of location estimation using image analysis is described. In this implementation, an image of a place is obtained and matched with previously stored images. The matching may be achieved by employing methods based on key feature extraction algorithm, color histogram analysis, pattern matching or other image comparison techniques. Upon determining a match, the location information associated with the image provides the location. The location information may be in the form of location tags or location keywords and the location information may be used by the user or other applications for the purposes of location determination. The technique allows for the user to enter location information. The location information may be assigned to the previously stored images residing in local and remote databases for users and applications to assign information or keywords to images.

20 Claims, 8 Drawing Sheets

Related U.S. Application Data continuation of application No. 11/686,733, filed on Mar. 15, 2007, now Pat. No. 8,144,920.

(51) Int. Cl.
*G01S 5/16* (2006.01)
*G06K 9/46* (2006.01)
*G06K 9/62* (2006.01)

(52) U.S. Cl.
CPC .......... *G01S 5/16* (2013.01); *G06F 17/30247* (2013.01); *G06F 17/30265* (2013.01); *G06F 17/30268* (2013.01); *G06K 9/4642* (2013.01); *G06K 9/4652* (2013.01); *G06K 9/6202* (2013.01)

(56) References Cited

U.S. PATENT DOCUMENTS

| | | | |
|---|---|---|---|
| 6,522,889 B1 | 2/2003 | Aarnio | |
| 6,711,293 B1 | 3/2004 | Lowe | |
| 6,904,160 B2* | 6/2005 | Burgess | G06F 17/30241 342/25 E |
| 6,999,780 B1 | 2/2006 | Zhao | |
| 7,076,259 B2 | 7/2006 | Belcea | |
| 7,123,925 B2 | 10/2006 | Robinson et al. | |
| 7,233,699 B2 | 6/2007 | Wenzel et al. | |
| 7,239,760 B2 | 7/2007 | Di Bernardo et al. | |
| 7,577,316 B2 | 8/2009 | Di Bernardo et al. | |
| 7,707,239 B2* | 4/2010 | Anderson | H04N 1/00281 348/231.3 |
| 7,739,033 B2 | 6/2010 | Murata et al. | |
| 7,830,144 B2 | 11/2010 | Duerk et al. | |
| 7,868,821 B2 | 1/2011 | Hoshizaki | |
| 7,872,669 B2 | 1/2011 | Darrell et al. | |
| 8,144,920 B2* | 3/2012 | Kansal | G01C 21/20 382/100 |
| 8,509,488 B1* | 8/2013 | Enge | G01C 21/3623 382/106 |
| 8,891,832 B2* | 11/2014 | Tseng | G06Q 50/01 382/118 |
| 9,297,881 B2* | 3/2016 | Khosravy | G01S 5/0263 |
| 9,348,845 B2* | 5/2016 | Minde | G06F 17/30265 |
| 2002/0181768 A1 | 12/2002 | Kim et al. | |
| 2003/0020816 A1 | 1/2003 | Hunter et al. | |
| 2003/0134647 A1 | 7/2003 | Santhoff et al. | |
| 2003/0210806 A1 | 11/2003 | Yoichi et al. | |
| 2004/0002344 A1 | 1/2004 | Moeglein et al. | |
| 2004/0203872 A1 | 10/2004 | Bajikar | |
| 2005/0075119 A1 | 4/2005 | Sheha et al. | |
| 2005/0079877 A1 | 4/2005 | Ichimura | |
| 2005/0162523 A1 | 7/2005 | Darrell et al. | |
| 2005/0228589 A1 | 10/2005 | Diggelen et al. | |
| 2008/0226130 A1 | 9/2008 | Kansal et al. | |

OTHER PUBLICATIONS

Fritz et al., "A Mobile Vision System for Urban Detection with Informative Local Descriptors," Jan. 2006, Proceedings of the Fourth IEEE International Conference on Computer Vision Systems, 9 pages.

Office action for U.S. Appl. No. 13/401,582, mailed on Sep. 10, 2013, Kansal, et al., "Location Estimation Using Image Analysis," 12 pages.

Office action for U.S. Appl. No. 13/401,582, mailed on May 1, 2014, Kansal et al., "Location Estimation Using Image Analysis," 16 pages.

Non-Final Office Action for U.S. Appl. No. 11/686,733, mailed on Jun. 23, 2011, Aman Kansal, "Automated Location Estimation Using Image Analysis," 22 pages.

Takizawa, "Self-Organizing Location Estimation Method using Ad-hoc Networks," available as early as Dec. 12, 2006, at<<http://ieeexplore.ieee.org/iel5/10853/34194/01630589.pdf?isNumber=>>, IEEE 7th Intl Conf on Mobile Data Management, May 2006, 5 pages.

Tollmar et al., "IDeixis—Image-based Deixis for Finding Location-Based Information," available as early as Dec. 12, 2006, at <<http://people.csail.mit.edu/tomyeh/pub/MHCI2004.pdf>>, ACM Conf on Human Computer Interaction, Apr. 2004, 14 pages.

Torralba et al., "Context-Based Vision System for Place and Object Recognition," In the Proceedings of the IEEE International Conference on Computer Vision (ICCV), Oct. 2003, 8 pages.

Toyama et al., "Geographic Location Tags on Digital Images," In the Proceedings of the Eleventh ACM International conference on Multimedia, Nov. 2003, pp. 156-166.

Yeh et al., "Searching the Web with Mobile Images for Location Recognition," Proceedings of the 2004 IEEE Computer Society Conference on Computer Vision and Pattern Recognition, Jun. and Jul. 20, 2004, 6 pages.

"Non-Final Office Action Issued in U.S. Appl. No. 11/686,733", Mailed Date: Sep. 21, 2010, 13 Pages.

"Non-Final Office Action Issued in U.S. Appl. No. 13/401,582", Mailed Date: Jul. 31, 2014, 14 Pages.

"Final Office Action Issued in U.S. Appl. No. 11/686,733," Mailed Date: Feb. 17, 2011, 24 Pages.

* cited by examiner

LOCATION ESTIMATION USING IMAGE ANALYSIS

CROSS REFERENCE TO RELATED PATENT APPLICATIONS

This application is a continuation of and claims priority to commonly assigned, co-pending U.S. patent application Ser. No. 13/401,582, filed Feb. 21, 2012, which is a continuation of U.S. patent application Ser. No. 11/686,733, filed on Mar. 15, 2007, now U.S. Pat. No. 8,144,920 and issued on Mar. 27, 2012. Application Ser. Nos. 13/401,582 and 11/686,722 and U.S. Pat. No. 8,144,920 are fully incorporated herein by reference in their entirety.

BACKGROUND

A number of methods to obtain a location of a device or user exist. These location estimation methods include methods based on global positioning system (GPS) or methods based on cellular base station signal strength. However, these systems suffer from various shortcomings. For example, GPS methods fail to work indoors where the satellite communication is not possible. The methods based on cellular base station signal lack sufficient accuracy. For example, conventional methods cannot distinguish between floors in a building, or two adjacent rooms and thus lack greater granularity in determining the location.

SUMMARY

Techniques for automated location estimation using image analysis are described. In one implementation, an image of a place is obtained and matched with previously stored images. The image matching may be achieved by employing methods based on key feature extraction algorithm, color histogram analysis, pattern matching or other image comparison techniques. Upon determining a match, the location information associated with the matching stored image provides the location of the place. The location information may be in the form of location tags or location keywords and may be used by the user or other applications for purposes of location determination. The above techniques also allow users to enter location information to improve accuracy. The location information may also be assigned to the previously stored images residing in local and remote databases for future use by users and applications.

This Summary is provided to introduce a selection of concepts in a simplified form that are further described below in the Detailed Description. This Summary is not intended to identify essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for determining the location of a place by analyzing the image of the place with respect to previously stored images. The images may be captured in a number of ways via any number of different devices, such as cellular phones, digital cameras, portable digital assistants (PDAs), and so forth. The images may be stored on the devices themselves or in separate databases.

More particularly, the techniques generally involve matching the image of the place with previously stored reference images captured from the same place. The previously stored images may have associated location information. The location information of the reference images that match the newly captured image provides the location of the place at which the new image is captured. Since the image of the place could be the image of a room in a building, it is possible to determine the location of a place with greater granularity. Further, the determination may be made on a computing device without any network communication system and thus can be employed indoors. For instance, the techniques may be used to distinguish between floors in a building or between two adjacent rooms.

These techniques may also be used along with other methods to determine the location. For example, the location of a place may be determined using both the GPS system and this technique to obtain an absolute location with greater granularity. The technique may also be used to verify the location of a user by requesting the user to provide an image of the current place to determine the location. Further, this technique may also be used to provide keywords to previously stored images. The previously stored images that match an obtained image may be assigned the location information associated with the image. The location information thus associated with the previously stored images may be used later by other users or application to determine the location of a place in an image.

Multiple and varied implementations and embodiments are described below. In the following section, an exemplary environment that is suitable for practicing various implementations is discussed. After this discussion, representative implementations of systems, devices, and processes for implementing the coverage-based image relevance ranking are described.

Exemplary Environment

Figure 1:
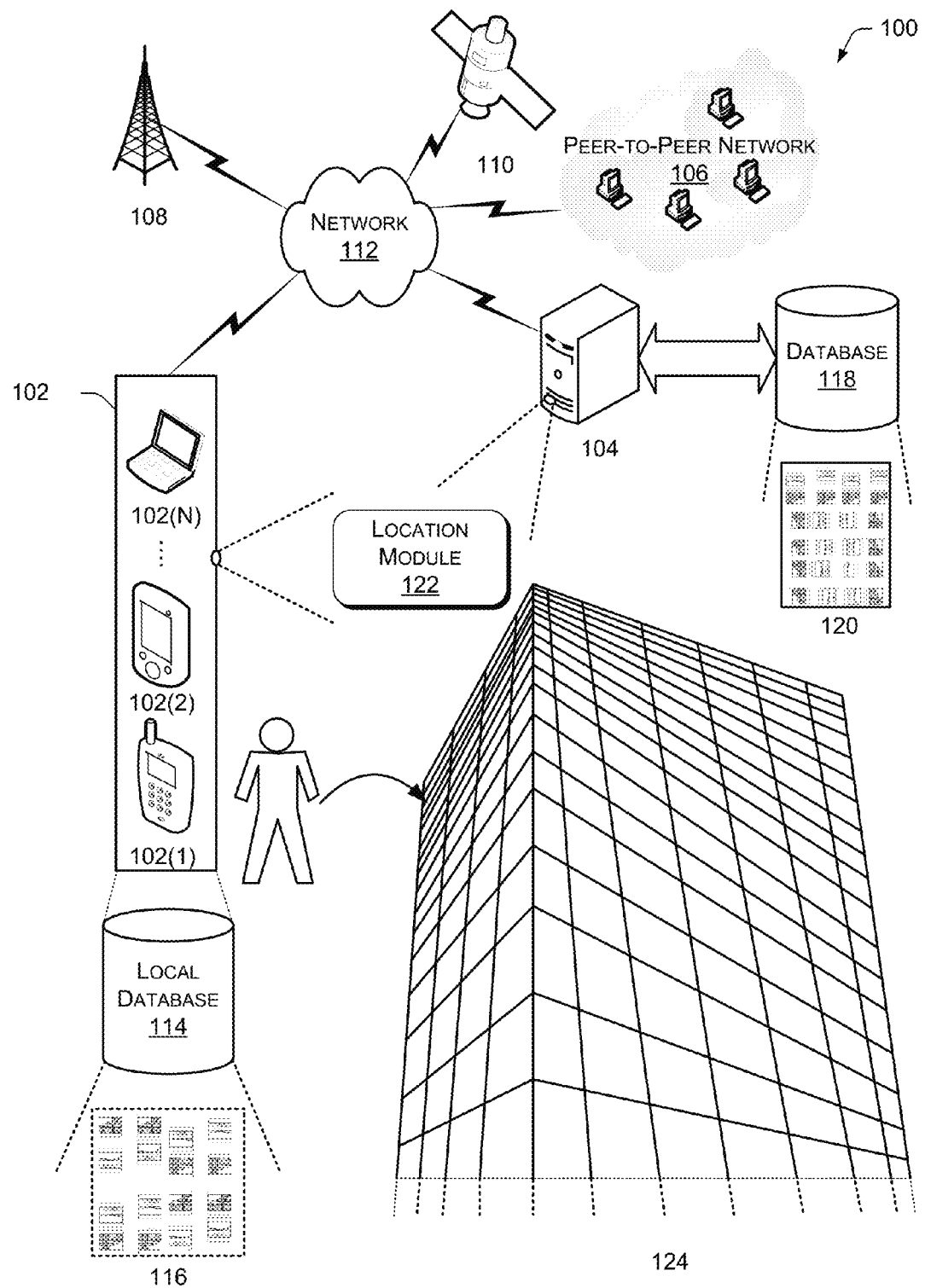
FIG. 1 illustrates an exemplary environment in which automated location estimation using image analysis may be implemented.

FIG. 1 shows an exemplary environment 100 to implement automated location estimation using image analysis. For discussion purposes, the environment 100 includes at least one computing device 102, which may be linked to one or more server computers 104, to one or more peer-to-peer networks 106, to one or more station towers 108, and to one or more satellites 110 via a network 112.

The computing device 102 may be implemented as any of a variety of devices including, for example, a camera, a personal digital assistant (PDA), a communication device such as a cellular phone, a portable computing device such as a portable computer (e.g., laptop, notebook, tablet, etc.) or other mobile computing device, an entertainment device such as a portable music player, a GPS-equipped device and so forth. In the exemplary environment 100, multiple computing devices 102(1)-102(N) are illustrated including a cellular phone 102(1), a PDA 102(2), and a laptop computer 102(N). Each computing device 102 may further include a local database 114, which may be implemented on a permanent memory (e.g., flash, hard drive, etc.), removable memory (e.g., memory card, etc.), or volatile memory (e.g., battery backed up random access memory). The local database 114 may contain a set of stored images 116 that were previously stored on the computing device 102.

The network 112 may be a wireless network, a wired network, or a combination thereof. The network 112 can be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs), cellular networks, satellite networks, cable networks, and so forth.

The server computer 104 is configured to store and serve images. The server computer may be implemented in many ways, including as a one or more server computers (perhaps arranged in as a server farm), a mainframe computer, and so forth. The server computer 104 may further include or have access to a database 118, which contains a set of previously stored images 120.

As shown in FIG. 1, any one of the computing device 102, peer-to-peer network devices 106, or the server computer 104 may be equipped with a location module 122 to implement automated location estimation using image analysis. The location module 122 determines or otherwise estimates the location of a place based on the image of the place. The location module 122 compares a newly acquired image with previously stored reference images 116 and/or 120 and attempts to locate a match based on image analysis of the images. The image analysis may utilize any number of techniques, including key feature extraction, color histogram analysis, pattern matching, or other image comparison techniques. Upon determining a match between the image and one or more of the reference images 116 and/or 120, the location module 122 assigns the location information associated with the matched reference images to the image. Alternatively, the location information associated with the matched reference image may be returned to the user or to another application to indicate the location of the image.

Figure 2:
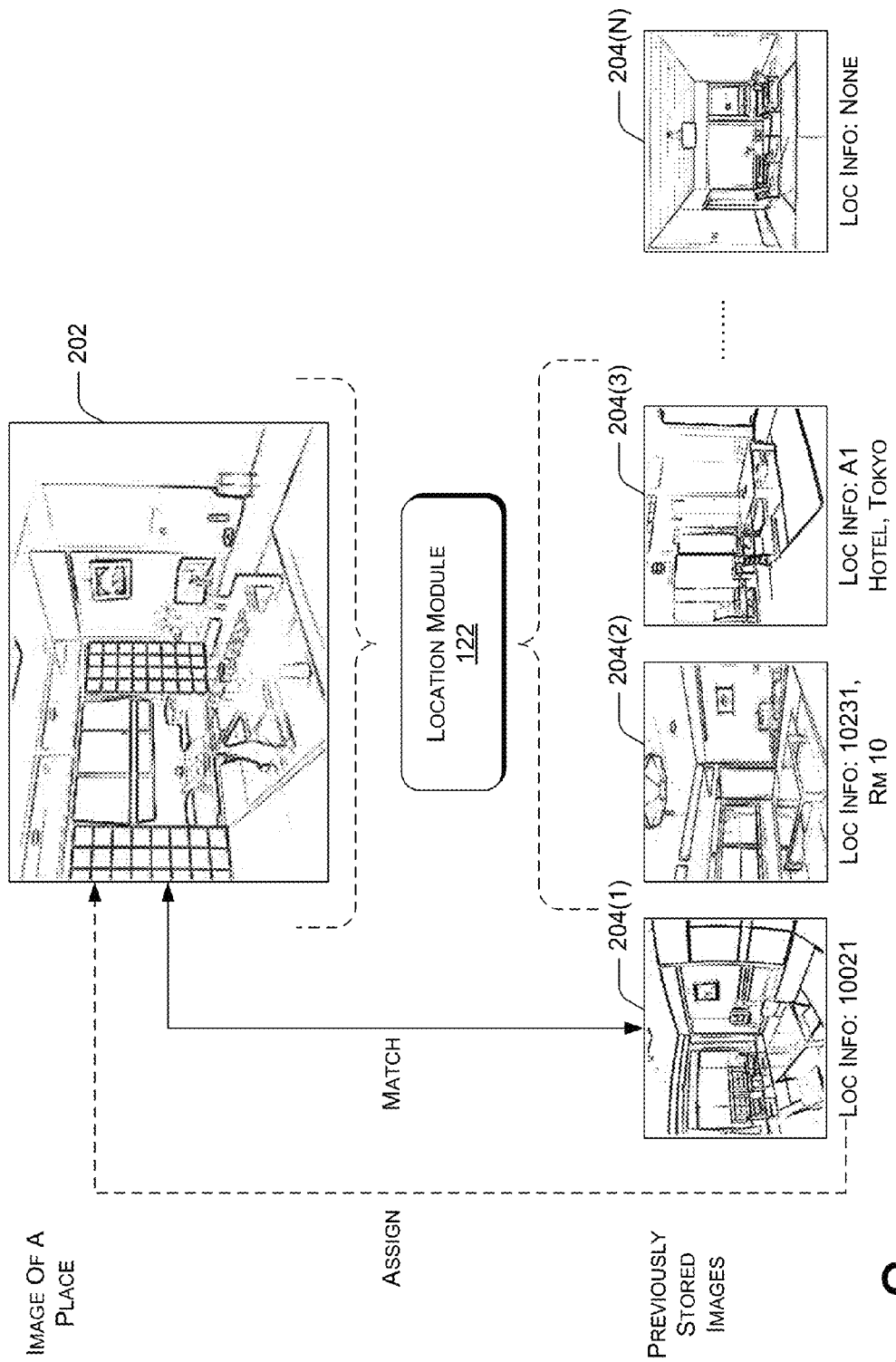
FIG. 2 is an exemplary diagram illustrating the determination of location using image analysis.

FIG. 2 provides an example of the determination of a location of a place based on the image of the place. In this figure, an image 202 represents an image of a place, such as an image of a room within a building, say building 124, the location of which the user may wish to know. The image 202 may be acquired by a computing device 102. The images 204(1) to 204(N) are previously stored images. The previously stored images 204 may be a collection of images taken by different users at different times. For example, these images may be images of different rooms in a building, which were acquired and indexed by different users. These images could also be collection of images of different places within a city or an area within the city. Further, these images may be images uploaded to image sharing websites that allow users to upload and tag images with keywords. In one example, the previously stored images 204 may be selected from within a larger collection of images based on factors such as area keywords, date and time of image acquisition and storing, and the databases specified by user. The previously stored images 204 may be found on the local database 114 within the previously stored images 116 or may be accessed from database 118 in previously stored images 120.

The previously stored images 204 may have associated location information. For example, the previously stored image 204(1) may have location information represented by a location tag. A location tag is merely a number, value, alphanumeric string, alphabet string, or any other unique string. It is unique for each location. Thus, the location of the previously stored image 204(1) is the location associated with location tag '10021'. As another possible implementation, the previously stored image 204(2) may have location information represented by both a location tag and a location keyword. A location keyword is description of the location, which may be provided by a prior user or another application. The location keyword may be used as either a detailed description of image or as a quick reference to a previously visited place. For example, in the previously stored image 204(2), the location keyword 'Rm 10' provides an indication to the user or another application utilizing the location keyword that the image may be of a certain room 10 in some building. This may have been a room previously visited by a person on a visit to Japan.

In another example, the previously stored image 204(3) may have only location keyword associated with it. Here, the previously stored image 204(3) represents A1 Hotel in Tokyo. The previously stored image 204(3) may not have any location tag associated with the image. Alternatively, the previously stored images may not have any associated location information. For example, the previously stored image 204(N) does not have any location information. The location information may be stored in a separate data structure where each entry within the data structure is referenced to an image.

In one implementation, a computing device 102 may acquire an image of a room in a building 124, say the image 202. The location module 122 attempts to match the image 202 with one or more of the previously stored images 204. In one implementation, the match may be achieved by using key feature extraction algorithm, color histogram analysis, pattern matching techniques, or a combination of one or more of the image matching techniques. For the purpose of discussion, suppose that the image 202 matches the previously stored image 204(1), the location information associated with the previously stored image 204(1) is assigned to the image 202. Thus, the location tag '10021' is assigned to the image 202. In another scenario, the location information may be returned to the user or other applications. For example, the location information may be displayed on the user interface of the computing device 102.

Alternatively, the location module 122 need not reside on the device acquiring or storing the image, but may be accessed remotely by a device or database when a location needs to be determined. For example, the location module 122 may reside on a server 104. The image 202 of the place may be provided to the server via the network 112. The server 104 itself may not have any local database of previously stored images to determine the location and may access the previously stored images 116 and 120 in the local database 114 and database 118 respectively.

In another implementation, the computing device 102 may acquire a location of a place using a global positioning system (GPS) by communicating with one or more satellites 108. Alternatively, the location of a place may be determined using a cellular network provided by network stations 106. The location module 122 may be utilized in conjunction with these methods to determine the location of the place with greater granularity. For example, the image 202 may match the previously stored image 204(2). Here, the location keyword associated with the image 204(2) merely indicates the description of the room as 'Rm 10'. Thus, the absolute location of the room may be obtained by determining the address of the building using a GPS and determining the location of the room using the location module 122 thereby achieving greater granularity In another implementation, the location module 122 may be utilized to verify the location of a place. For example, some location-based services may wish to avoid malicious users taking advantage of their services by modifying the information provided via the GPS or the cellular network. Thus, the location-based services may request the user to send an image of the current location to verify the location of the user.

In another implementation, location information may be added to stored images that may have no, or partial, information. For instance, suppose the image 202 matches the previously stored image 204(N), which does not have any associated location information. Since the location information for the particular place is unavailable, the location module 122 may prompt the user to input the location information. Alternatively, the location information may be provided by an application that recognizes the location of the place. The input may be in the form of a location tag or location keyword or a combination of both. In one implementation, the provided location information may be associated with the image 202. In another implementation, the provided location information may additionally be associated with the previously stored image 204(N) for future references.

In another situation, the location module 122 may prompt the user to input location information even if the location information is available. For example, the image 202 may match the previously stored images 204(1). Here, the location module 122 may request more location information from the user. Further, in another implementation, the location information provided by the user may be associated with all the previously stored images 204 that match the previously stored image 204(1). For example, the previously stored images 204(2) and 204(N) may match the previously stored image 204(1). The location information provided with respect to the image 204(1) may be associated with the previously stored images 204(2) and 204(N).

Exemplary System

Figure 3:
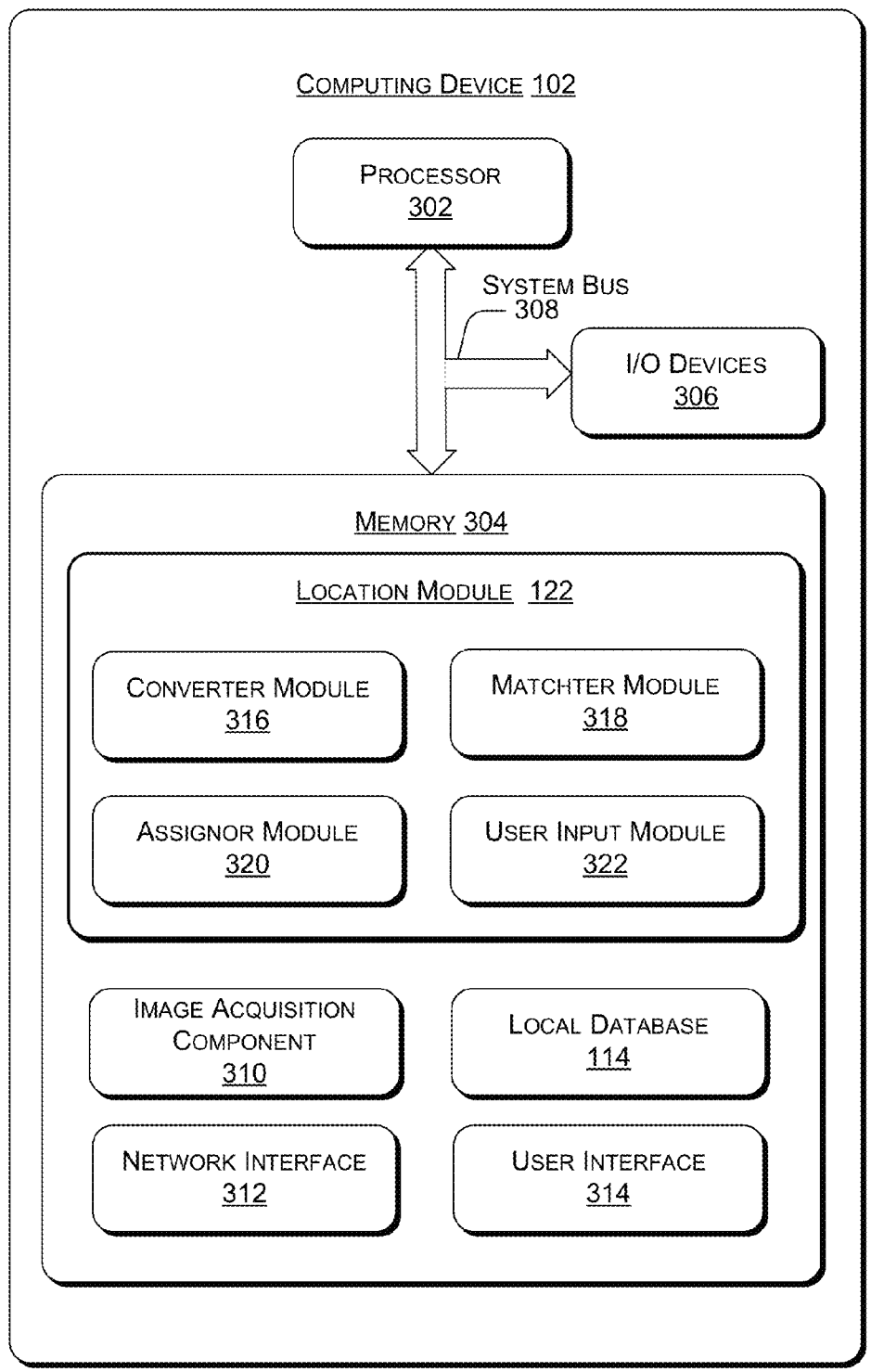
FIG. 3 is a block diagram illustrating an exemplary computing device for implementing automated location estimation using image analysis.

FIG. 3 illustrates various components of an exemplary computing device 302 suitable for implementing automated location estimation using image analysis. The computing device 302 is representative of any one of the devices shown in FIG. 1, including computing devices 102, and server 104. The computing device 302 can include, but is not limited to, a processor 302, a memory 304, Input/Output (I/O) devices 306 (e.g., keyboard, mouse, camera, web-cam, scanner and so forth), and a system bus 308 that operatively couples various components including processor 302 to memory 304.

System bus 308 represents any of the several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Memory 304 includes computer-readable media in the form of volatile memory, such as Random Access Memory (RAM) and/or non-volatile memory, such as Read Only Memory (ROM) or flash RAM. Memory 304 typically includes data and/or program modules for implementing automated location estimation using image analysis that are immediately accessible to and/or presently operated on by processor 302. In one embodiment, memory 304 includes the location module 122, which may be implemented as computer software or firmware composed of computer-executable instructions that may be executed on the processor 302.

Though FIG. 3 shows the location module 122 as residing on the computing device 102, it will be understood that the image analysis module 122 need not be hosted on the computing device 102. For example, the location module 122 could also be hosted on a storage medium communicatively coupled to the computing device 102. This includes the possibility of the location module 122 being hosted in whole, or in part, on the computing device 102.

Generally, program modules executed on the components of computing device 102 include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise computer storage media that includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by a computer.

In one implementation, the memory 304 may additionally include an image acquisition component 310, a local database 114, a network interface 312, and a user interface 314. The image acquisition component 310 acquires an image of a place. For example, the image 202 may be acquired by the image acquisition component 310 by accessing a camera within the I/O devices 306. The location module 122 determines the location of an image, say the image 202, acquired by the image acquisition component 310. The local database 114 stores the previously acquired images 116. The images may be stored in the local database 114 in a format that allows for automatic matching of images. For example, the previously stored images 116 may be stored as image data extracted after employing a key feature extraction algorithm, color histogram analysis or pattern-matching techniques. This may reduce the processing requirements for the computing device 102. Further, the local database 114 need not reside on the memory of the computing device 102. It may be accessed from an external memory or device connected to the computing device 102.

In one implementation, the computing device 102 may be connected to the network 112 to access various devices such as the server 104, the peer-to-peer devices 106, the network tower 108, and the satellites 110 via the network interface 312. The network interface 312 may allow the computing device to connect wirelessly to a network to access the internet. The network interface 312 also allows the user to access local and remote databases, such as database 114 and 118. In another implementation, the computing device 102 may have a user interface 314 to allow the user to interact with the computing device 102. The user interface 314 may be used to display the location information associated with the image of the place to the user. Alternatively, the user interface 314 may be used to allow the user to input location information.

In one implementation, the location module 122 may include a converter module 316, a matcher module 318, an assignor module 320 and a user input module 322. The converter module 316 converts an image into a comparable format for image analysis. For example, the image 202 may be converted into a format based on key feature extraction algorithms, color histogram analysis or pattern-matching techniques. The converter module 316 may also convert the previously stored images 204 into a comparable format. The converter module 316 may also decide which comparable format to convert images into depending upon the format of the previously stored images 204.

The matcher module 318 matches an image with previously stored images. For example, the image 202 in comparable format may be matched with the previously stored images 204 to obtain a match with the previously stored image 204(1). The assignor module 320 assigns the location information of the matched previously stored image to the image. For example, the assignor module 320 assigns the location information of the previously stored image 204(1) to the image 202. The user input module 322 allows for the user to input location information. For example, the user input module 322 may allow users to input location information for image 202. This may be desirable if the previously stored images do not have any location information or if the location information is insufficient.

Exemplary Processes

Figure 4:
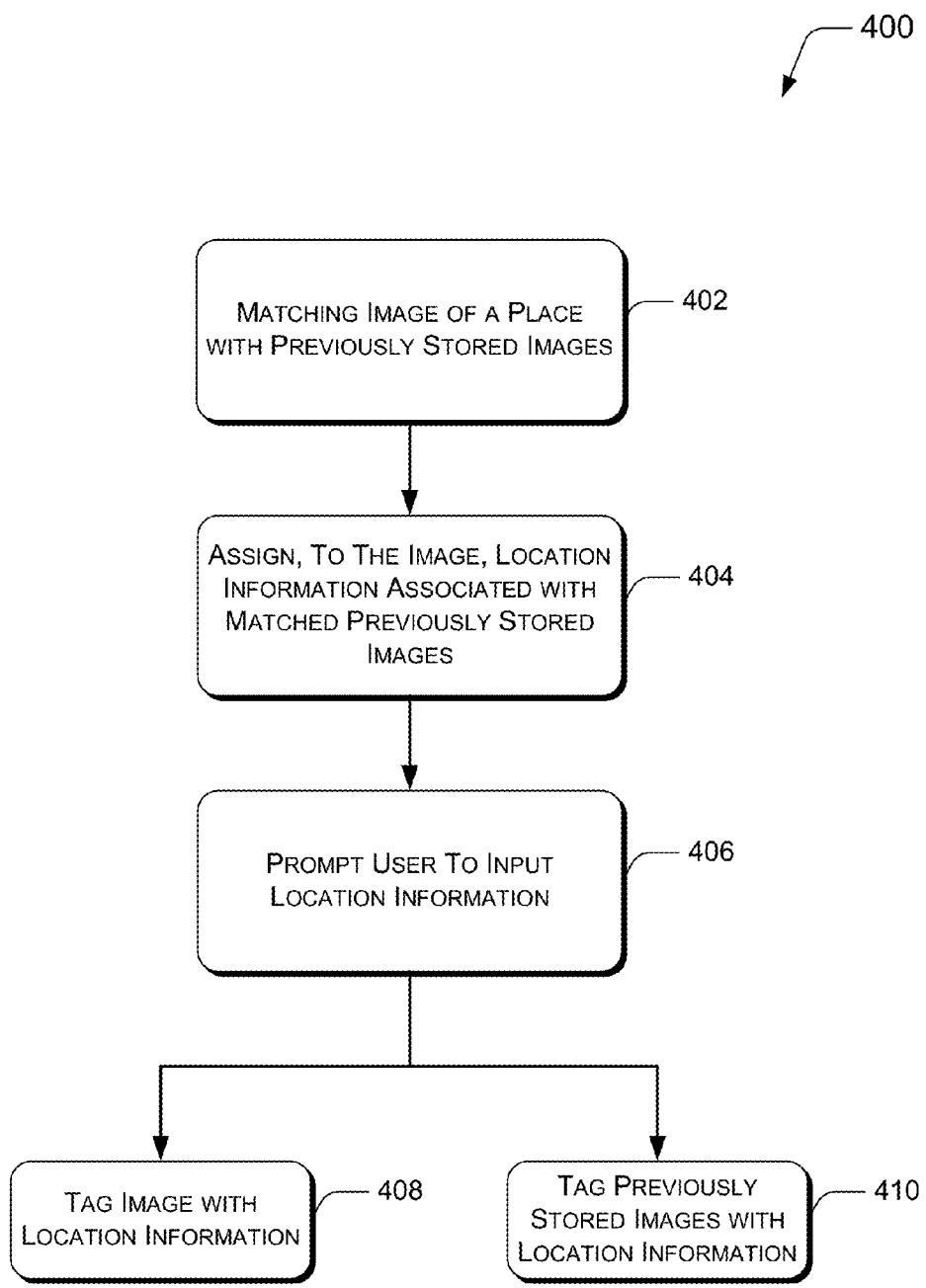
FIG. 4 is a flow diagram illustrating an exemplary process for determining the location of a place based on image analysis.

FIG. 4 illustrates an exemplary process 400 for implementing automated location estimation using image analysis. The process 400 (as well as other processes described below) is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 400 (as well as other processes described below) is described with reference to environment 100 shown in FIG. 1 and FIG. 2 and computing device 302 shown in FIG. 3. It will be apparent to a person ordinarily skilled in the art that the environment 100, and the computing device 302 are described for exemplary purposes and the process 400 (as well as other processes described below) may be implemented in other environments, systems or network architectures to comply with other optimization policies.

Generally, the process 400 determines the location of a place based on an image of the place. At block 402, an image of a place is matched with previously stored images. An image of a place may be acquired by one or more computing devices 102 by capturing a digital image of the place. The previously stored images may include, for example, the images 116 stored on local database 112, or the images 120 stored on database 118 and sets of the previously stored images may be represented as the previously stored images 204 as in FIG. 2. For the purposes of continuing discussion, it may be assumed that the previously stored images 204 are retrieved.

At block 404, the location information associated with a matched previously stored image is assigned to the image. For example, in FIG. 2, if the image 202 matched the previously stored image 204(1), then the location information associated with 204(1) may be assigned to the image 202. This location information allows a user or an application to determine the location of a place.

Additionally, at block 406, after determining a match between the image and the previously stored image, the user may optionally be prompted to enter further location information. For example, the location information associated with a previously stored image may not be sufficient or understandable. Further, the user may wish to add either a quick reference keyword or a detailed description of the place for future reference. Thus, the user may be prompted to input location information. At block 408, the image is tagged with the location information input by the user. Similarly, at block 410, the previously stored images with location information are tagged with the location information.

Figure 5:
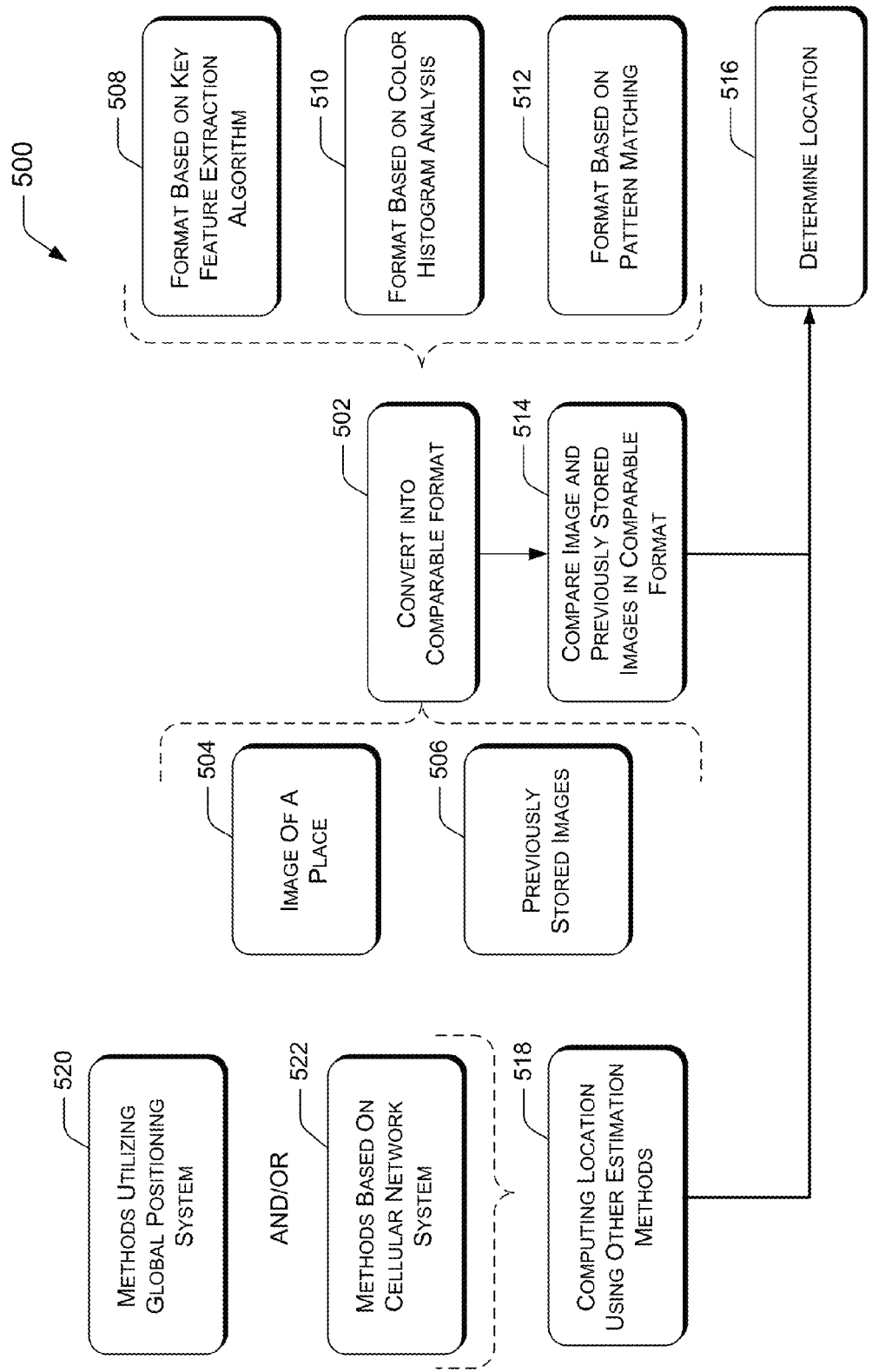
FIG. 5 is a flow diagram illustrating an exemplary process for determining the location of a place based on image analysis.

FIG. 5 illustrates another exemplary process 500 for determining the location of a place based on the image of a place. The order in which the process is described is not intended to be construed as a limitation, and any number of the described blocks can be combined in any order to implement the method, or an alternate method. Additionally, individual blocks may be deleted from the process without departing from the spirit and scope of the subject matter described herein. Furthermore, the process can be implemented in any suitable hardware, software, firmware, or combination thereof.

At block 502, the image of a place (as presented at block 504) and the previously stored images (as presented at block 506) are converted into a comparable format. The converter module 316 may perform the above operation. The image of the place may be acquired by the computing device 102 as shown in FIG. 1. For example, the image acquisition component 310 in the computing device as provided in FIG. 3 acquires the image of the place for the determination of the location of the place. For the purpose of discussion, the image of the place may be considered as the image 202 as shown in FIG. 2. The previously stored images may be the images 116 and 120 that may reside on the local database 114 and database 118 respectively. Again for the purpose of illustration, the images represented by the images 204 may be considered as the previously stored images.

The image 202 and the previously stored images 204 may be converted into a variety of formats for the purpose of comparison. For example, the image 202 and the previously stored images 204 may be converted into a format based on key feature extraction algorithm as shown at block 508. Key features are certain features of an image such as corners of objects, or peculiar textures in the scene that seem to vary very little when considered from different angles or varying light levels. Each key feature includes in its description a pixel in the image where the key feature is located. The key features within an image may be extracted by using key feature extraction techniques and algorithms known in the art. In one implementation, the images 202 and 204 may be scaled before performing the key feature extraction. The extracted key features from an image form the basis for the format based on key feature extraction.

Another example of a comparable format is a format based on color histogram analysis as shown at block 510. Every image has a unique combination of colors and frequency of the occurrence of the colors. Hence an image of a place has a unique combination of colors that would get replicated in other images of the same place. Thus, analyzing the color histograms using methods and techniques known in the art allows for comparison of images. Another such example of a comparable format is a format based on pattern matching as shown at block 512. The basis for comparison in pattern matching technique is based on determining the existence of given patterns in a certain image. The images of the same place depict underlying common patterns that may be detected for the purpose of comparison.

At block 514, the converted image and the converted previously stored images are compared to find matching images. This operation may be performed by the matcher module 318 within the location module 122. For purpose of discussion, the matching may be performed between the image 202 and the previously stored images 204. In one example, the images 202 and 204 may be converted into a format based on key feature algorithm. As discussed above, the format is represented by the key features extracted from the images. The key features of the images 202 and 204 are compared to ascertain a match. In making the determination whether two key features match, a certain threshold of error is allowed to make the matching robust to slight variations in the key feature arising due to change in quality of image, perspective, light levels, etc.

In one implementation, the key features are analyzed to eliminate spurious key feature matches. The vector difference of the pixel locations of the matched key feature in the input image and the corresponding matched key feature in the previously stored image for each matched pair is computed. Each difference vector consists of two elements, corresponding to the horizontal and vertical dimensions. Threshold distances are determined by the matcher module 318 for the horizontal and vertical components respectively. This determination is based upon the distance vectors for each pair of matched key features. All the matched key features for which the horizontal and vertical components of difference vectors lie within threshold distances are considered non-spurious matches and are retained. The remaining key features are rejected as spurious matches by the key feature matching module 318.

Figure 7:
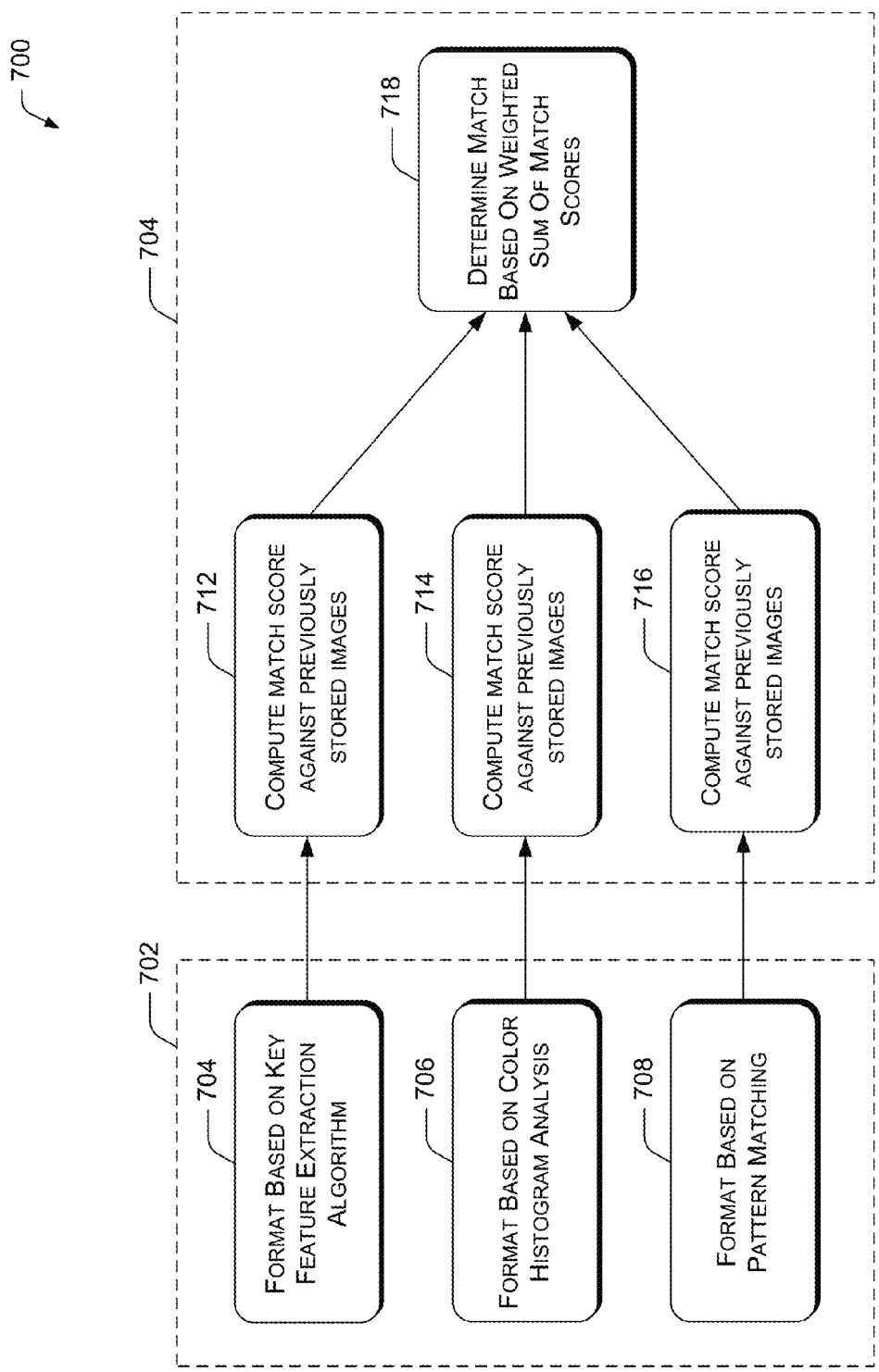
FIG. 7 is a flow diagram illustrating an exemplary process determining matched previously stored images by combining one or more image analysis techniques.
Figure 8:
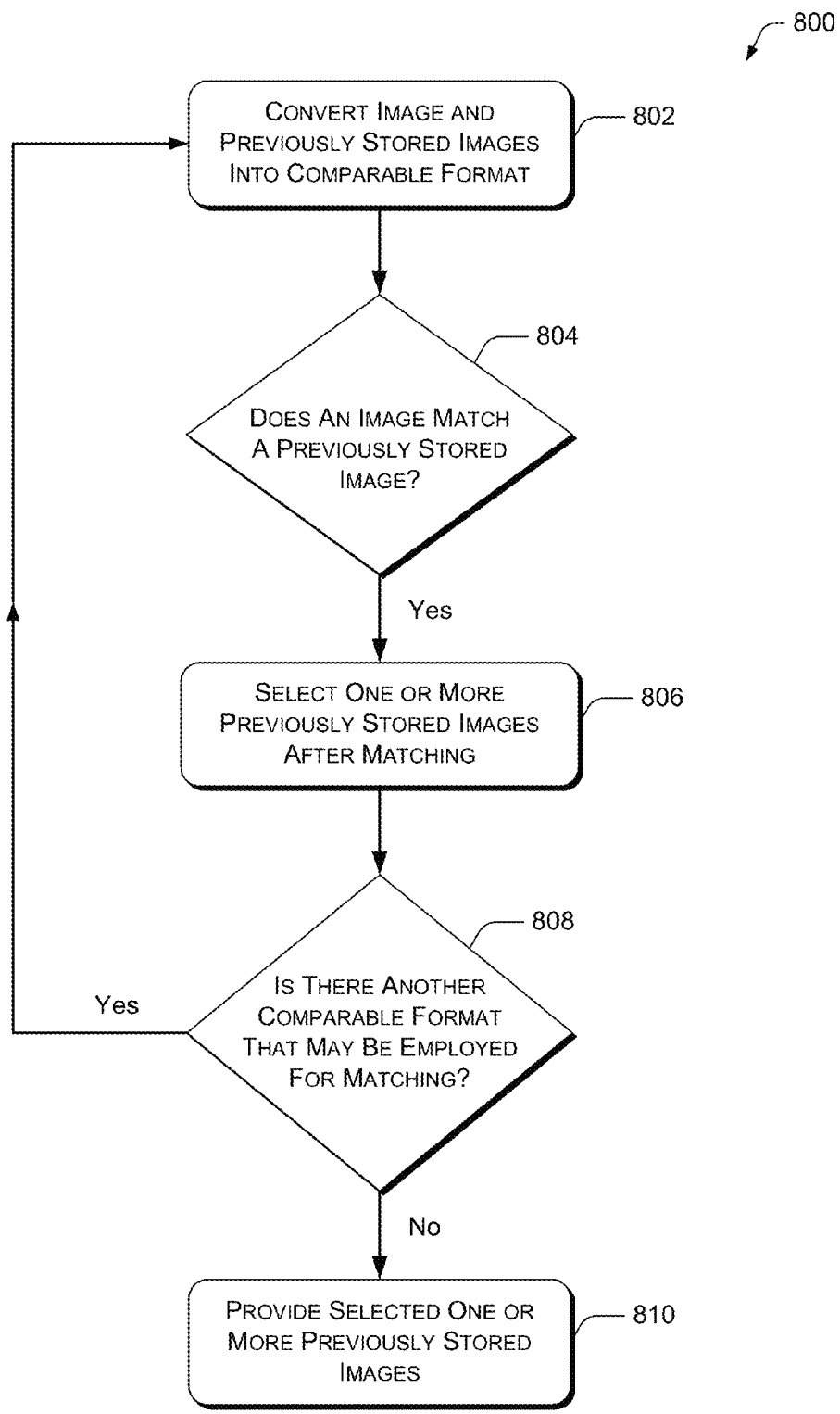
FIG. 8 is a flow diagram illustrating another exemplary process for determining matched previously stored images by combining one or more image analysis techniques.

In another implementation, the images 202 and 204 may be converted into a format based on color histogram analysis. In this format, the color histograms of images 202 and 204 are compared to provide a match. For the purpose of matching a threshold of error may be set for robust matching. Similarly, the images 202 and 204 may be compared and matched after converting the images into a format based on pattern-matching. In another implementation, a combination of comparable formats may be used to determine the matched previously stored images. For example, an image may be matched using a combination of techniques employing key feature extraction algorithm, color histogram analysis and pattern matching techniques. The combination may be achieved by employing these techniques together or in tandem. FIGS. 7 and 8 show exemplary processes for combining such techniques.

At block 516, the location is determined based on the location information of the matched previously stored image. For example, if the previously stored image 204(1) matches the image 202, then the location information '10021' associated with the previously stored image 204(1) provides the location of the place. The location information '10021' may be recognizable or useful to the user or an application using this information for the determination of the location either relatively or absolutely.

Additionally, at block 518, other location estimation methods may be used in conjunction with the image location estimation using image analysis to determine the location of a place. For example, as shown at block 520, the location of the area may be determined using methods based on GPS to augment the location information provided by the previously stored images. Similarly, as shown at block 520, the location of an area may be determined by methods based on the cellular network system. Further, the location returned by the other estimation methods may be verified using automated location estimation using image analysis. For example, a user may be required to provide an image of a location in addition to the location information using other estimation methods. The automated location estimation using image analysis may be employed to verify the location information as provided by the user.

Figure 6:
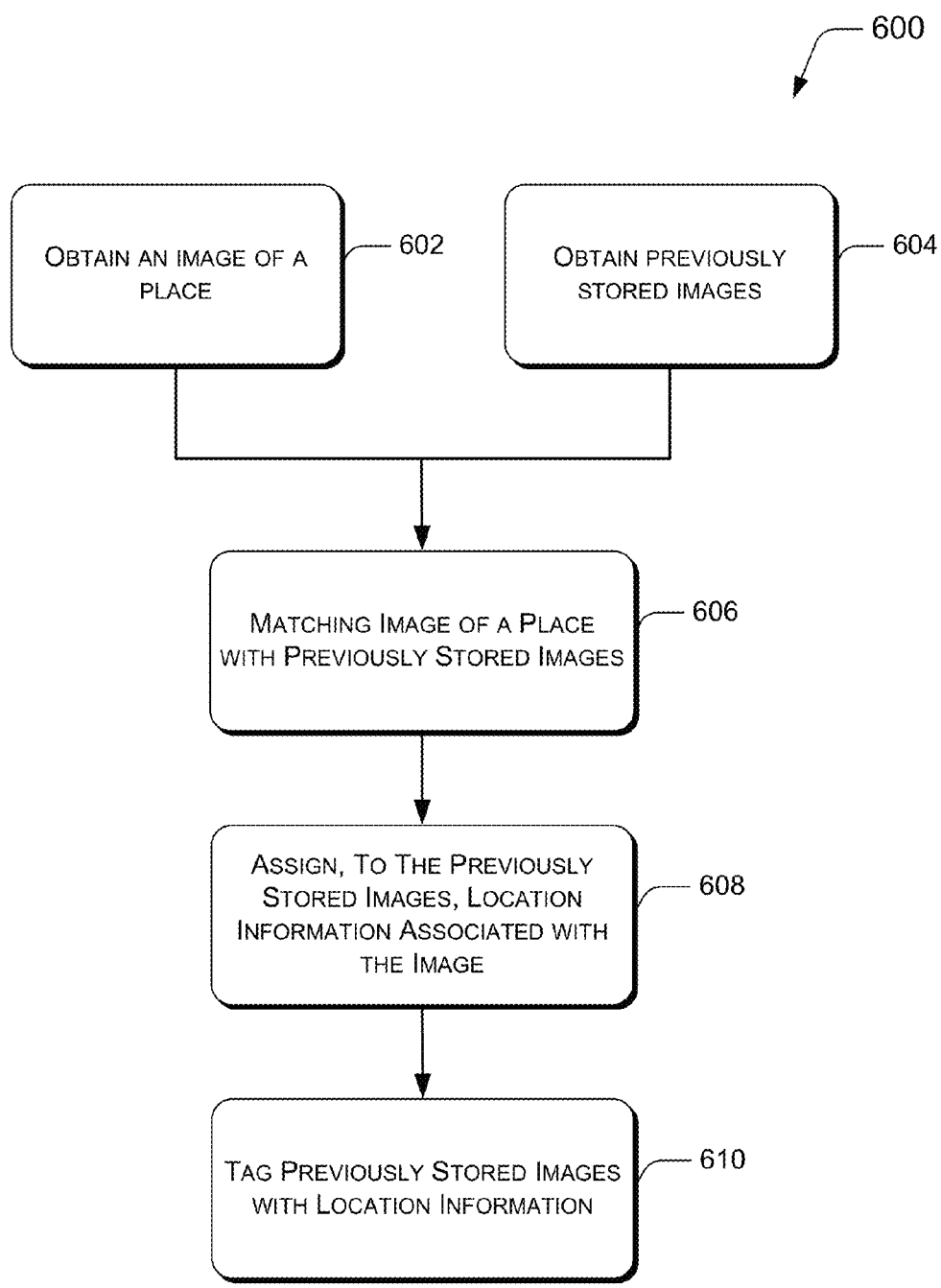
FIG. 6 is a flow diagram illustration of an exemplary process for assigning location information to previously stored images.

FIG. 6 illustrates an exemplary process 600 for assigning location information to previously stored images. The order in which the process is described is not intended to be construed as a limitation, and any number of the described blocks can be combined in any order to implement the method, or an alternate method. Additionally, individual blocks may be deleted from the process without departing from the spirit and scope of the subject matter described herein. Furthermore, the process can be implemented in any suitable hardware, software, firmware, or combination thereof.

At block 602, the image of a place is obtained. The image of the place may be obtained by a computing device 102 acquiring an image of the place. Alternatively, the server 104 may obtain an image of the place from the computing device 102 or from the local database 114. At block 604, the previously stored images are obtained. The previously stored images may be obtained from a local database 114 of a computing device or from a database 118 which may be accessed by a server 104 or a combination of both. At block 606, the image and the previously stored images are matched. This operation may be performed by the matcher module 318 within the location module 122. The match may be obtained after converting the image and the previously stored images into a comparable format and comparing these images. The matching may be robust to allow for matching images of a place taken under different conditions.

At block 608, the previously stored images that match the image of the place are assigned the location information associated with the image. For example, the image of the place obtained from a computing device 102 at the server 104 may already have location information. The image may have location information if a user input the location information, or if the image was assigned location information previously by a location module. Alternatively, another application may have assigned location information to the image. The previously stored images accessible to the server 104, say the images 120, may have either no location information or different location information. This operation allows the previously stored images to be assigned location information, which would allow other computing devices 102 to use these previously stored images to determine location.

At block 610, the previously stored images are tagged with location information input by the user. In addition to the assignment of location information from an image, the user may wish to input more information to the matched previously stored images. For example, a user may wish to customize the previously stored images 120 for his immediate friends and family that may be aware of quick reference keywords to identify places. The tagging allows for the input of location keywords to achieve this customization.

FIG. 7 illustrates an exemplary process 700 for determining matched previously stored images by combining one or more image analysis techniques. The order in which the process is described is not intended to be construed as a limitation, and any number of the described blocks can be combined in any order to implement the method, or an alternate method. Additionally, individual blocks may be deleted from the process without departing from the spirit and scope of the subject matter described herein. Furthermore, the process can be implemented in any suitable hardware, software, firmware, or combination thereof.

At block 702, an image and one or more previously stored images are converted into different comparable formats. This operation may be performed by the converter module 316 in the computing device 102. In one implementation, the image 202 and the previously stored images 204 may be converted into different formats for comparison. At block 704, an image and the previously stored images are converted into a format based on key feature extraction algorithm. Similarly, at block 706 and block 708, the image and the previously stored images are converted into a format based on color histogram analysis and a format based on pattern matching respectively.

At block 710, the matched previously stored images are determined by combining the results provided by different image analysis techniques. This operation may be performed by the matcher module 318 in the computing device 102. At block 712, a match score for previously stored images with respect to the image is computed where the image and the previously stored images are in a format based on key feature extraction algorithm. In one implementation, the match score may be represented by the percentage of match found between the image and the previously stored images.

At block 714, a match score for previously stored images with respect to the image is computed where the image and the previously stored images are in a format based on color histogram analysis. As discussed above, the match score may be represented by the percentage of match found between the image and the previously stored images. At block 716, a match score for previously stored images with respect to the image is computed where the image and the previously stored images are in a format based on pattern matching.

At block 718, a match based on the weighted sum of the match scores of the previously stored images is determined. For example, the match scores for a previously stored image 204(1) may be 80%, 75% and 73% as per the above techniques employed. If equal weight is provided to each of the techniques then the weighted score of the previously stored image 204(1) is 76%. Similarly, for a previously stored image 204(2), the match scores may be 81%, 70%, 70% providing a weighted score of 74%. The comparison of the weighted score may provide the desired match between the previously stored image and the image. In one implementation, the match metric may be modified to give different weight to different comparable formats. In another implementation, one or more of the comparable formats may not be employed to improve computation. Further, other image analysis techniques may be used additionally or alternatively with the disclosed techniques to determine the match.

FIG. 8 illustrates an exemplary process 800 for determining matched previously stored images by combining one or more image analysis techniques. The order in which the process is described is not intended to be construed as a limitation, and any number of the described blocks can be combined in any order to implement the method, or an alternate method. Additionally, individual blocks may be deleted from the process without departing from the spirit and scope of the subject matter described herein. Furthermore, the process can be implemented in any suitable hardware, software, firmware, or combination thereof.

At block 802, an image and provided previously stored images are converted into a comparable format. For example, the image 202 and the previously stored images 204 may be converted into a comparable format. In one implementation, the images 202 and 204 may be converted into a format based on color histogram analysis. The images 202 and 204 may be converted into this format initially if the computation for matching based on this format is less than other formats. Alternatively, the images 202 and 204 may be converted initially into a format that requires less computation for matching.

At block 804, the image and previously stored images are matched. For example, the comparison of the images 202 and 204 may result in the images 204(1), 204(2) and 204(3) satisfying the threshold value required for the comparable format to be considered a match. At block 806, the one or more previously stored images that matched are selected. (Represented by the "Yes" branch of the block 804).

At block 808, whether another comparable format may be employed for matching is determined. For example, where only one previously stored image is selected, employing another comparable format for narrowing the number of matched images is not necessary. However, if the number of matches provided is significant, another matching based on another comparable format may be desirable for narrowing the number of previously stored images. In one implementation, it may be desired to match the image 202 against the selected previously stored images 204(1), 204(2) and 204(3) for greater accuracy in matching. For example, the match as determined using key feature extraction algorithms may be more accurate but also computationally demanding. By eliminating a set of previously stored images using computationally less demanding techniques, and then employing computationally demanding techniques such as key feature extraction algorithms on the selected images, the overall accuracy may be increased without requiring higher computational ability.

Where another comparable format may be employed for matching, (represented by the "Yes" branch of the block 808), the image and the selected previously stored images are converted into another comparable format at block 802 and the process continued. If such further comparison is not desired or available, the selected previously stored images are provided as the match for the image.

CONCLUSION

Although the present disclosure has been described in language specific to structural features and/or methodological acts, it is to be understood that the present disclosure defined in the appended claims is not necessarily limited to the specific features or acts described. Rather, the specific features and acts are disclosed as exemplary forms of implementing the claimed present disclosure.

We claim:

1. One or more computer storage devices storing computer-readable instructions that, when executed by one or more processors, perform acts comprising:
    acquiring a first image of a location;
    iteratively comparing the first image in a first format and a second format with two or more second images in the first format and the second format by:
        identifying, using a first image analysis technique on the first image in the first format and the two or more second images in the first format, a subset of potential matching images from the two or more second images, wherein the two or more second images are stored in one or more databases associated with one or more location service devices; and
        identifying, using a second image analysis technique on the first image in the second format and the subset of potential matching images in the second format, one or more third images from the subset of potential matching images that match the first image;
    determining that the one or more third images that match the first image lack location information;
    prompting, based at least in part on determining that the one or more third images that match the first image lack location information, a user to input location information for the first image;
    assigning the location information to the first image; and
    updating the one or more databases by storing the first image and the location information in the one or more databases for future use by the one or more location service devices in determining a location associated with future images.

2. The one or more computer storage devices of claim 1, the acts further comprising assigning the location information to the one or more third images that match the first image.

3. The one or more computer storage devices of claim 1, the acts further comprising assigning the location information to the one or more third images in response to determining that the one or more third images are lacking location information.

4. The one or more computer storage devices of claim 1, the acts further comprising assigning to the one or more third images the location information in response to determining that the one or more third images have conflicting location information.

5. The one or more computer-readable storage devices of claim 1, the acts further comprising:
    receiving additional matching images that match with the first image; and
    assigning the location information to one or more additional matching images.

6. The one or more computer storage devices of claim 1, wherein the input comprises at least one of a location tag or a location keyword.

7. The one or more computer storage devices of claim 1, wherein the comparing the first image to the two or more second images comprises:
    converting the first image into a first format for the first image analysis technique; and
    comparing the first image in the first format with the two or more second images using the first image analysis technique.

8. A method comprising:
    obtaining a first image;
    matching, by one or more processors associated with a location service and configured by executable instructions, the first image with one or more second images stored in one or more databases associated with the location service, the matching being based at least in part on comparisons between the first image and each of the one or more second images, the matching comprising:
        converting the first image into a first format for a first image comparison technique and into a second format for a second image comparison technique; and
        iteratively comparing the first image with two or more of the second images to:
            identify, using the first image comparison technique on the first image in the first format and the two or more of the second images in the first format, a subset of potential image matches, and
            identify, using the second image comparison technique on the first image in the second format and the subset of potential image matches in the second format, one or more third images from the subset of potential image matches that match the first image;
    determining that the one or more third images that match the first image lack location information;
    prompting, based at least in part on determining that the one or more third images that match the first image lack location information, a user to input location information for the image;
    assigning the location information to the first image; and
    updating the one or more databases associated with the location service by storing the first image and the location information in the one or more databases for future use by the location service in determining a location associated with future images.

9. The method of claim 8, further comprising:
    assigning the location information to the one or more third images of the subset of potential images that match the first image.

10. The method of claim 8, further comprising:
    determining that the one or more third images have conflicting location information; and
    in response to determining that the one or more third images have conflicting location information, assigning the location information to the one or more third images.

11. The method of claim 8, further comprising:
    determining that the one or more third images have insufficient location information; and
    supplementing the insufficient location information with the location information.

12. The method of claim 8, further comprising determining that an alternative location estimation method is not available, the alternative location estimation method comprising at least one of a global positioning system (GPS) location estimation method or a cellular network location estimation method.

13. The method of claim 8, wherein the location information comprises at least one of a location tag or a location keyword.

14. The method of claim 8, further comprising computing a location of a place in the image using estimation methods, the estimation methods comprising location estimation methods utilizing one or more of global positioning systems and cellular network systems.

15. A system comprising:
one or more processors;
memory communicatively coupled to the one or more processors;
an image acquisition component stored in the memory that, when executed by the one or more processors, acquires first image of an environment of a computing device associated with the system;
a location module stored in the memory that, when executed by the one or more processors, performs acts comprising:
iteratively comparing the first image in a first format and a second format with two or more second images in the first format and the second format to identify one or more third images that match the first image using one or more image comparison techniques, wherein the two or more second images are stored in one or more databases;
determining that the one or more third images that match the first image lack location information or have insufficient location information;
prompting, based at least in part on determining that the one or more third images that match the first image lack location information or have insufficient location information, a user to input location information for the first image;
assigning the location information to the first image; and
updating the one or more databases by storing the first image and the location information in the one or more databases for future use by the location module in determining a location associated with future images.

16. The system of claim 15, the acts further comprising:
assigning the location information to the one or more third images.

17. The system of claim 15, the acts further comprising:
determining that the one or more third images have conflicting location information; and
in response to determining that the one or more third images have conflicting location information, assigning the location information to the one or more third images.

18. The system of claim 15, the acts further comprising:
determining that the one or more third images have insufficient location information; and
supplementing the insufficient location information with the location information.

19. The system of claim 15, the acts further comprising:
determining that an alternative location estimation method is not available, the alternative location estimation method comprising at least one of a global positioning system (GPS) location estimation method or a cellular network location estimation method; and
wherein the prompting the user to input the location information is based at least in part on determining that the alternative location estimation method is not available.

20. The system of claim 15, wherein the location information includes at least one of an indication of a room of a building corresponding to the environment of the computing device, or an indication of a floor of the building.

* * * * *